United States Patent
Nakamura et al.

(10) Patent No.: US 7,252,896 B2
(45) Date of Patent: Aug. 7, 2007

(54) MAGNETIC RECORDING MEDIUM AND MAGNETIC RECORDING/REPRODUCING APPARATUS

(75) Inventors: Futoshi Nakamura, Ichikawa (JP); Takashi Hikosaka, Tokyo (JP); Soichi Oikawa, Chiba (JP); Takeshi Iwasaki, Funabashi (JP); Tomoyuki Maeda, Funabashi (JP); Hiroshi Sakai, Ichihara (JP); Kenji Shimizu, Ichihara (JP); Akira Sakawaki, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 568 days.

(21) Appl. No.: 10/788,259

(22) Filed: Feb. 27, 2004

(65) Prior Publication Data

US 2004/0224185 A1    Nov. 11, 2004

(30) Foreign Application Priority Data

Feb. 28, 2003    (JP)    ............................ 2003-054837

(51) Int. Cl.
   *G11B 5/66*    (2006.01)
(52) U.S. Cl. ..................................... 428/832
(58) Field of Classification Search ............... 428/832, 428/827, 840.1
   See application file for complete search history.

(56) References Cited

U.S. PATENT DOCUMENTS

| | | | |
|---|---|---|---|
| 4,844,963 A | * | 7/1989 | Takasuna et al. ......... 428/840.1 |
| 6,379,775 B1 | | 4/2002 | Kobayashi |
| 2001/0012573 A1 | | 8/2001 | Kaitsu et al. |
| 2001/0041273 A1 | | 11/2001 | Uwazumi et al. |
| 2002/0114975 A1 | | 8/2002 | Oikawa et al. |
| 2002/0127433 A1 | | 9/2002 | Shimizu et al. |
| 2002/0136926 A1 | | 9/2002 | Oikawa et al. |

FOREIGN PATENT DOCUMENTS

| | | |
|---|---|---|
| JP | 11-025439 A | 1/1999 |
| JP | 2000-123344 A | 4/2000 |
| JP | 2002-133645 | 5/2002 |
| JP | 2002-163819 | 6/2002 |
| JP | 2002-197635 | 7/2002 |
| JP | 2002-260207 | 9/2002 |

OTHER PUBLICATIONS

Austrian Search Report dated Nov. 30, 2004 for Appln. No. 200400880-1.

* cited by examiner

*Primary Examiner*—Holly Rickman
(74) *Attorney, Agent, or Firm*—Pillsbury Winthrop Shaw Pittman, LLP

(57) ABSTRACT

An orientation control layer having a granular structure is formed between a substrate and magnetic recording layer, contains a base material and grains dispersed in the base material, and having a thickness smaller than a grain size of the grains.

26 Claims, 4 Drawing Sheets

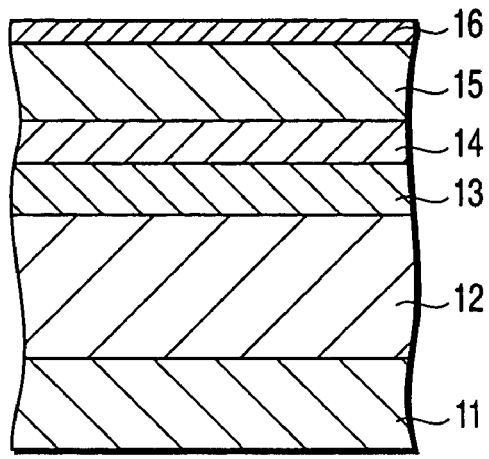
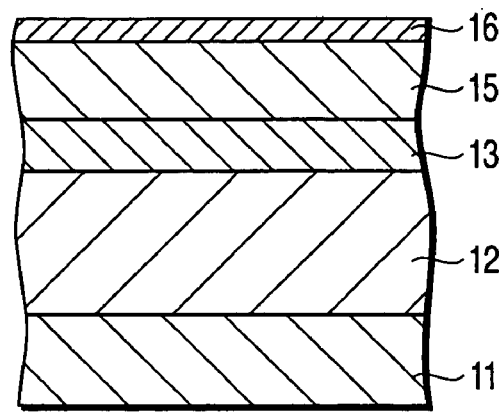
F I G. 6    F I G. 7
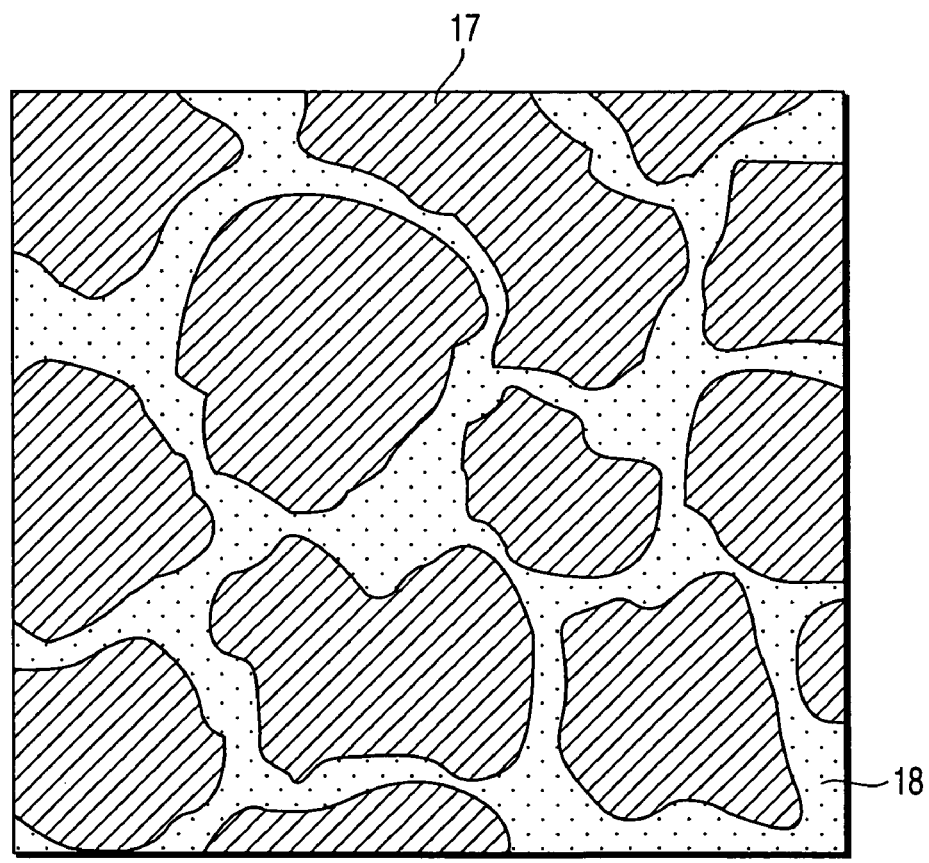
F I G. 8
|— 10nm —|

MAGNETIC RECORDING MEDIUM AND MAGNETIC RECORDING/REPRODUCING APPARATUS

CROSS-REFERENCE TO RELATED APPLICATIONS

This application is based upon and claims the benefit of priority from prior Japanese Patent Application No. 2003-054837, filed Feb. 28, 2003, the entire contents of which are incorporated herein by reference.

BACKGROUND OF THE INVENTION

1. Field of the Invention

The present invention relates to a magnetic recording medium for use in, e.g., a hard disk drive using the magnetic recording technique, and a magnetic recording/reproducing apparatus using the magnetic recording medium.

2. Description of the Related Art

To increase the recording density of a magnetic recording medium, it is important to maintain the anisotropy of a magnetic recording layer and at the same time increase the recording resolution by decreasing the size of magnetic crystal grains. To decrease the size of crystal grains in the magnetic recording layer, various underlayers and seed layers are conventionally used.

For example, Jpn. Pat. Appln. KOKAI Publication No. 2002-197635 proposes a method in which the surface of a soft magnetic layer is partially or completely oxidized, and an orientation control layer having a face-centered cubic structure (fcc) or hexagonal closest packed structure (hcp) is stacked on the oxidized surface to decrease the grain size of this orientation control layer, thereby improving the noise characteristics of a magnetic recording layer formed on it.

Also, Jpn. Pat. Appln. KOKAI Publication No. 2002-260207 proposes a method in which an orientation control layer which preferentially orients a body-centered cubic structure (bcc) nonmagnetic underlayer in the direction of (200) is formed below the nonmagnetic underlayer by oxidation or nitriding, thereby decreasing the grain size of the nonmagnetic underlayer and that of a magnetic recording layer formed on the orientation control layer.

By these methods, crystal grains of the nonmagnetic underlayer and magnetic recording layer can be grown finely to a certain degree by using the partially oxidized or nitrided material as a core. However, the degree of fineness cannot be well controlled. In addition, when the surface of the soft magnetic film is partially or completely oxidized or the orientation control film is oxidized or nitrided, the orientation of the orientation control film degrades. Therefore, although the grain size of the orientation control layer decreases, the orientation of the layer becomes unsatisfactory and worse than that of a layer not partially or completely oxidized or nitrided. As a consequence, the characteristics cannot be well improved.

Also, Jpn. Pat. Appln. KOKAI Publication No. 2002-133645 discloses a magnetic recording medium having an arrangement in which a nonmagnetic interlayer having a granular structure made up of nonmagnetic crystal grains and a metal oxide or carbide surrounding the grains and a magnetic recording layer having a granular structure made up of ferromagnetic crystal grains and a metal oxide or carbide surrounding the grains are stacked on a substrate.

Unfortunately, granular-structure grains are three-dimensionally dispersed in an orientation control layer. Therefore, if this layer is used as a magnetic recording layer, the grains are more or less separated from each other to decrease saturation magnetization Ms of the magnetic recording layer, and as a consequence the output lowers. Also, since the orientation is random, the size of the magnetic grains must be increased to a certain degree in order to obtain sufficient magnetic anisotropy equal to a high recording density. This undesirably lowers the recording density.

BRIEF SUMMARY OF THE INVENTION

First, the present invention provides a magnetic recording medium characterized by comprising a nonmagnetic substrate, an orientation control layer formed on the nonmagnetic substrate, having a granular structure containing a base material and grains dispersed in the base material, and having a thickness smaller than the grain size of the grains, and a magnetic recording layer formed on the orientation control layer.

Second, the present invention provides a magnetic recording/reproducing apparatus characterized by comprising a magnetic recording medium of the first invention which comprises a nonmagnetic substrate, an orientation control layer formed on the nonmagnetic substrate, having a granular structure containing a base material and grains dispersed in the base material, and having a thickness smaller than the grain size of the grains, and a magnetic recording layer formed on the orientation control layer, and a recording/reproducing head.

BRIEF DESCRIPTION OF THE SEVERAL VIEWS OF THE DRAWING

The accompanying drawings, which are incorporated in and constitute a part of the specification, illustrate presently embodiments of the invention and, together with the general description given above and the detailed description of the embodiments given below, serve to explain the principles of the invention.

FIG. 6 is a schematic sectional view showing the fifth example of the magnetic recording medium of the present invention;

FIG. 7 is a schematic sectional view showing the first example of a conventional magnetic recording medium;

FIG. 8 is a model view showing the planar structure of a CoFe—BN underlayer;

DETAILED DESCRIPTION OF THE INVENTION

Figure 1:
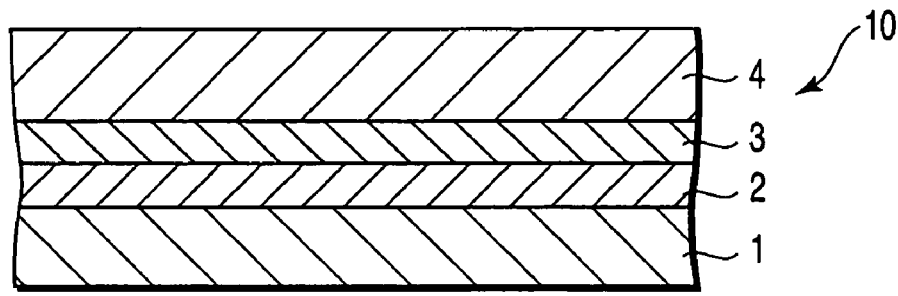
FIG. 1 is a schematic sectional view showing the first example of a magnetic recording medium of the present invention.

A magnetic recording medium of the present invention includes a nonmagnetic substrate, an orientation control layer formed on the nonmagnetic substrate, and a magnetic recording layer formed on the orientation control layer. This orientation control layer has a granular structure containing a base material and grains made of a Co—Fe-based alloy and dispersed in the base material, and has a thickness smaller than the grain size of the grains.

In the present invention, the thickness of the orientation control layer is smaller than the grain size of the grains in the granular structure. This prevents the grains from being buried in the base material on the surface of the orientation control layer. Accordingly, the orientation control layer surface can maintain the state in which grains having a predetermined size and surrounded by the base material are well dispersed. This makes it possible to decrease the size of crystal grains in a layer which grows close to the orientation control layer. Especially when Co is 90 at % or more in a Co—Fe-based alloy, there is a composition ratio which is the boundary between a face-centered cubic structure and hexagonal closest packed structure. Fine grains having the closest packed structure are easily formed in this case.

Also, in the present invention, the base material of the granular-structure film as the orientation control layer can be made of a nitride or carbide. If a granular-structure film whose base material is made of an oxide is used as the orientation control layer, the oxygen in the base material often adversely affects the orientation of granular grains having large influence on orientation control.

On the orientation control layer, a magnetic recording layer can be formed directly or via an underlayer or the like. By thus forming the orientation control layer having the granular structure, it is possible to decrease the size of crystal grains in the magnetic recording layer and improve its crystal orientation. This increases the recording resolution and medium noise ratio, and makes high-density recording feasible.

Note that the orientation control layer granular structure used in the present invention is the state in which when the plane of the orientation control layer is observed, the base material surrounds the grains, and these base material and grains do not substantially form any solid solution.

As the orientation control layer, a weak magnetic film or nonmagnetic film can be used. When these films are used, the magnetic recording layer hardly produces noise by electromagnetic conversion.

The weak magnetic film has a saturation magnetization of 400 emu/cc or less, preferably, 10 to 100 emu/cc, and a coercive force of 8 kA/m or less, preferably, 0.04 to 0.8 kA/m. Saturation magnetization exceeding 400 emu/cc often makes magnetization of the magnetic layer unstable. A coercive force exceeding 8 kA/m often produces medium noise.

In one embodiment, grains used in the orientation control layer can have an average grain size of 10 nm or less, and in some embodiments, 3 to 10 nm. A grain size herein mentioned is based upon an image of a grain obtained when the plane of a film is observed. When grains falling within this range are used, the grain size of the magnetic recording layer can be well decreased. However, if the grain size of the grains is less than 3 nm, the grains in the magnetic layer become too fine, and this often makes recording magnetization unstable. If the grain size exceeds 10 nm, the grains in the magnetic layer become too coarse, and this often causes magnetization transition noise.

In one embodiment of the present invention, as the grains used in the orientation control layer, it is possible to use at least one type selected from, e.g., Fe, Co, Ni, Cr, Ru, Pt, Mo, W, and Re. The use of these materials is advantageous to control the perpendicular orientation, i.e., the (002)-face orientation of a Co-based alloy film which is promising as the material of a perpendicular recording layer. In some embodiments, it is possible to use Pt, Ru, Co—Fe, Re, Ti, RuCr, NiTa, CoPt, CoB, CoRu, CoCr, CoCrMo, CoCrW, and CoCrPt.

As the base material used in the orientation control layer, for example in one embodiment, it is possible to use at least one type selected from Si, B, Zr, Ta, Al, Cr, C, and their carbides and nitrides.

Examples of combinations of the grains and base materials are CoFe—C, CoFe—BN, CoFe—TaN, CoFe—ZrN, CoFe—TaC, CoFe—B$_4$C, CoFe—CrN, CoFe—AlN, Pt—C, Pt—BN, Pt—TaN, Pt—ZrN, Pt—TaC, Pt—B$_4$C, Pt—CrN, and Pt—AlN. When these combinations are used, fine high-density metal grains can be well dispersed without forming any solid solution with the base material.

In one embodiment, CoFe—BN, CoFe—TaN, CoFe—ZrN, and CoFe—TaC can be used.

In some embodiments, CoFe—BN can be used. These base materials have the advantage that they separate and downsize the above-mentioned grains without degrading the orientation of the grains.

The present invention will be described in more detail below with reference to the accompanying drawing.

FIG. 1 is a schematic sectional view showing the first example of the magnetic recording medium of the present invention.

As shown in FIG. 1, a magnetic recording medium 10 has an arrangement in which a soft magnetic layer 2, an orientation control layer 3 having a granular structure which contains grains and a base material surrounding the grains, and a magnetic recording layer 4 are stacked in this order on a substrate 1.

For example in one embodiment, of the layers adjacent to the orientation control layer, the layer positioned on a side away from the substrate can contain an element the content of which is largest of all elements contained in the grains. This is so because the orientation of the orientation control layer is readily transferred to an adjacent layer grown on it. As this adjacent layer, it is possible to apply, e.g., a magnetic recording layer or its underlayer. This is particularly effective to improve the perpendicular orientation of the adjacent layer.

Figure 2:
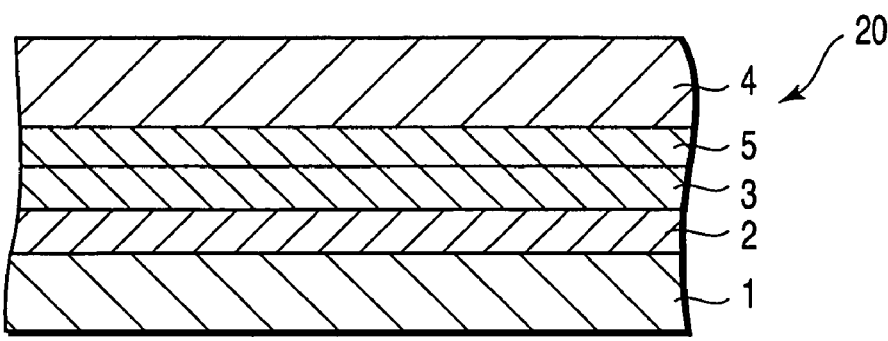
FIG. 2 is a schematic sectional view showing the second example of the magnetic recording medium of the present invention.

FIG. 2 is a schematic sectional view showing the second example of the magnetic recording medium of the present invention.

As shown in FIG. 2, a magnetic recording medium 20 has an arrangement in which a soft magnetic layer 2, an orientation control layer 3 having a granular structure which contains grains and a base material surrounding the grains, an underlayer 5, and a magnetic recording layer 4 are stacked in this order on a substrate 1.

Of the layers adjacent to the orientation control layer, one adjacent layer positioned on the substrate side preferably has one of a hexagonal closest packed structure and face-centered cubic structure as a closest packed crystal structure. This is particularly effective to improve the perpendicular orientation of another layer adjacent to the orientation control layer. As this one adjacent layer, a seed layer can be applied.

Figure 3:
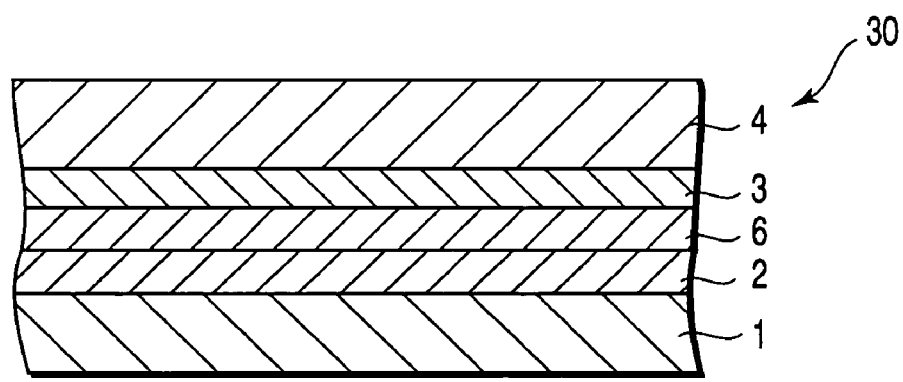
FIG. 3 is a schematic sectional view showing the third example of the magnetic recording medium of the present invention.
Figure 4:
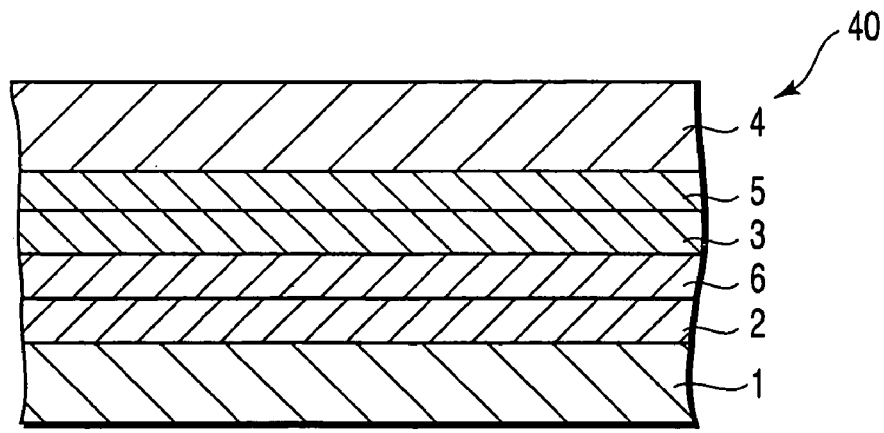
FIG. 4 is a schematic sectional view showing the fourth example of the magnetic recording medium of the present invention.

FIGS. 3 and 4 are schematic sectional views showing the third and fourth examples, respectively, of the magnetic recording medium of the present invention.

As shown in FIG. 3, a magnetic recording medium 30 has an arrangement in which a soft magnetic layer 2, a seed layer 6 having a closest packed crystal structure, an orientation control layer 3 having a granular structure which contains grains and a base material surrounding the grains, and a magnetic recording layer 4 are stacked in this order on a substrate 1.

As shown in FIG. 4, a magnetic recording medium 40 has an arrangement in which a soft magnetic layer 2, a seed layer 6 having a closest packed crystal structure, an orientation control layer 3 having a granular structure which contains grains and a base material surrounding the grains, an underlayer 5, and a magnetic recording layer 4 are stacked in this order on a substrate 1.

In one embodiment, the grains used in the orientation control layer can have an average grain size smaller than that of the crystal grains in the layer having the closest packed crystal structure. When the closest packed structure and fine grains as described above are used, the grain size of crystal grains in a layer grown on the orientation control layer further decreases, and this improves the crystal orientation, particularly, the perpendicular orientation. The grain size of the layer having the closest packed crystal structure can be larger than that of the grains in the granular structure. In one embodiment, it is possible to choose a grain size by which better orientation can be obtained.

Examples of the material of the magnetic recording layer used in the present invention are Co—Cr, Co—Pt, Co—Cr—Pt, Co—Cr—Pt—Ta, Co—Cr—Pt—O, and Co—Cr—Pt—Ta—B.

In the present invention, the layer having the granular structure described above is formed as the orientation control layer. Therefore, even when a general CoCrPt-based magnetic layer is formed as a perpendicular magnetic recording layer, the magnetic grains are separated into fine grains. This makes it possible to obtain a high-output, low-noise medium having satisfactorily fine crystal grains and sufficient magnetization equivalent to those of a CoCrPt—$SiO_2$-based magnetic layer known to be suited to high-density recording. Compared to this CoCrPt—$SiO_2$-based magnetic layer, the CoCrPt-based magnetic layer has the advantage that the saturation magnetization is high and so a sufficient output can be easily obtained.

When the magnetic recording medium of the present invention has a perpendicular magnetic recording layer, a soft magnetic layer can be formed between this perpendicular magnetic recording layer and the substrate.

When a soft magnetic layer having high magnetic permeability is formed, a so-called double-layered perpendicular medium having a perpendicular magnetic recording layer on this soft magnetic layer is obtained. In this double-layered perpendicular medium, the soft magnetic layer performs part of the function of a magnetic head, i.e., horizontally passes the recording magnetic field from a magnetic head, e.g., a single pole head for magnetizing the perpendicular magnetic recording layer, and returns the recording magnetic field to the magnetic head. That is, the soft magnetic field applies a steep sufficient perpendicular magnetic field to the magnetic recording layer, thereby increasing the recording/reproduction efficiency.

As the soft magnetic material, it is possible to use CoZrNb, FeCoB, FeCoN, FeTaC, FeTaN, FeNi, and FeAlSi, each of which has a high saturation magnetic flux density and favorable soft magnetic characteristics.

In addition, a bias application layer such as a longitudinal hard magnetic film or antiferromagnetic film can be formed between the soft magnetic layer and substrate. The soft magnetic layer readily forms a magnetic domain, and this magnetic domain generates spike noise. The generation of a magnetic wall can be prevented by applying a magnetic field in one direction of the radial direction of the bias application layer, thereby applying a bias magnetic field to the soft magnetic layer formed on the bias application layer. It is also possible to give the bias application layer a stacked structure to finely disperse the anisotropy and make a large magnetic domain difficult to form.

Examples of the bias application layer material are CoCrPt, CoCrPtB, CoCrPtTa, CoCrPtTaNd, CoSm, CoPt, CoPtO, CoPtCrO, CoPt—$SiO_2$, CoCrPt—$SiO_2$, and CoCrPtO—$SiO_2$.

The magnetic recording layer, soft magnetic layer, bias application layer, and various orientation control layers such as an underlayer and seed layer usable in the magnetic recording medium of the present invention can be stacked in order by using the conventional sputtering technique such as DC sputtering method, RF sputtering method, ion-beam sputtering method, vapor deposition method. In one embodiment, the DC sputtering method can be also used for forming orientation control layers according to a component such as a carbon or a composition of a base material. Although a conventional sputtering method not using a permanent magnet provided on the back of a target can be used, in one embodiment, it is suitable to use a magnetron sputtering method with using such a permanent magnet provided on the back of a target.

A gas flow pressure of an inert gas can be 0.1 to 10 Pa in a sputtering condition for forming the orientation controlling layer and the magnetic recording layer. It tends to be difficult to cause electrical discharge when the gas flow pressure is not higher than 0.1 Pa. These layers tend to become non-uniform when the gas flow pressure is not lower than 10 Pa.

A gas flow pressure of an inert gas can be 0.1 to 1.0 Pa in a sputtering condition for forming a soft magnetic layer, an underlayer, and a protective layer. It tends to be difficult to cause electrical discharge when the gas flow pressure is not higher than 0.1 Pa. These layers tend to become loose and crystallizabilities of the layers tend to be deteriorated when the gas flow pressure is not lower than 1.0 Pa.

Also, the above layers can be formed on one or both of the two surfaces of the substrate.

The magnetic recording/reproducing apparatus of the present invention has the magnetic recording medium described above, and a recording head, reproducing head, or recording/reproducing composite head.

In the perpendicular magnetic recording system, a single pole head, for example, can be used as the recording head.

In the longitudinal magnetic recording system, a ring head, for example, can be used as the recording head.

Figure 5:
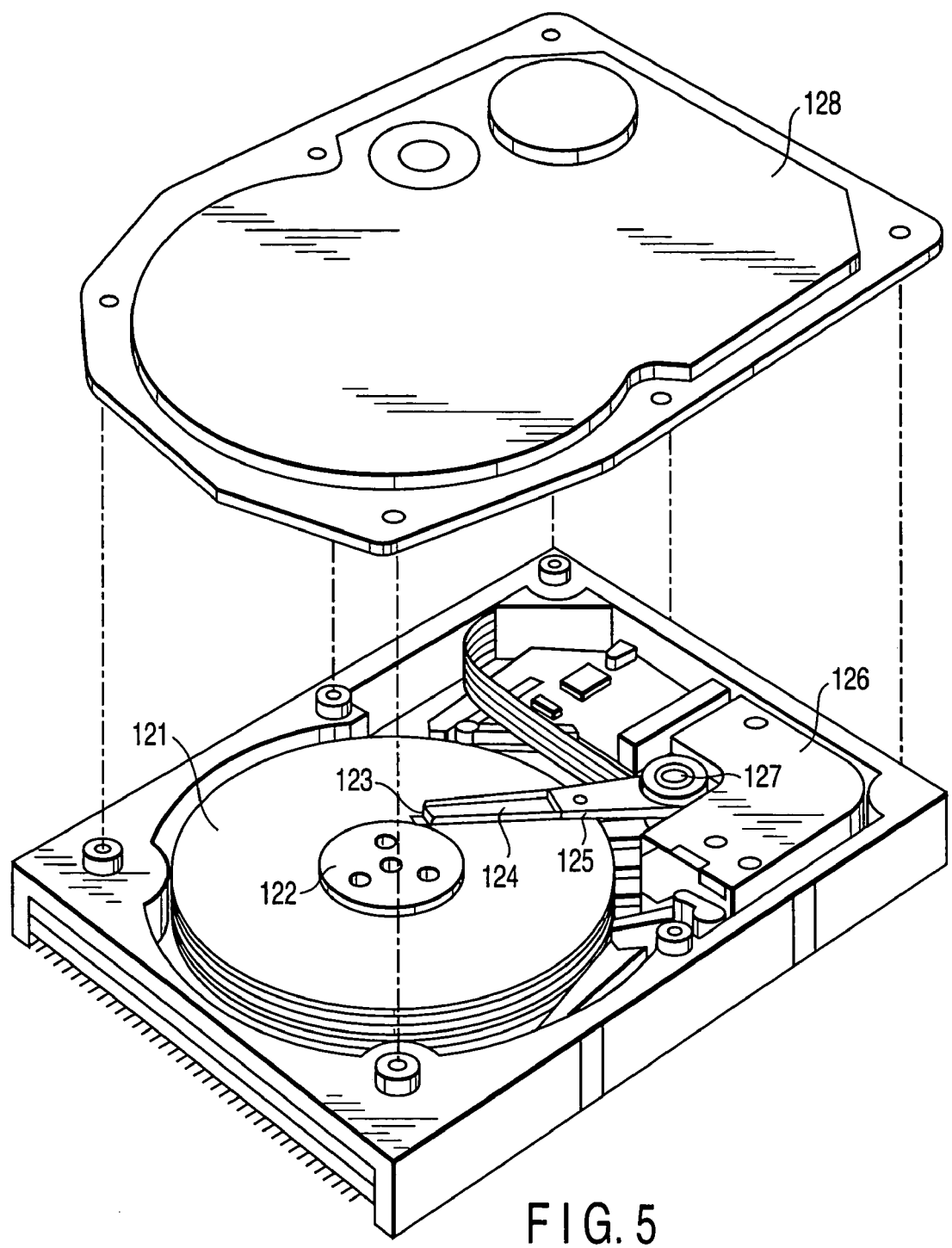
FIG. 5 is a partially exploded perspective view showing an example of a magnetic recording/reproducing apparatus of the present invention.

FIG. 5 is a partially exploded perspective view showing an example of the magnetic recording/reproducing apparatus of the present invention.

A rigid magnetic disk 121 for recording information according to the present invention is fitted on a spindle 122 and rotated at a predetermined rotational speed by a spindle motor (not shown). A slider 123 mounting a single pole recording head for accessing the magnetic disk 121 to record information and an MR head for reproducing information is attached to the end portion of a suspension 124 which is a thin leaf spring. The suspension 124 is connected to one end of an arm 125 having, e.g., a bobbin which holds a driving coil (not shown).

A voice coil motor 126 as a kind of a linear motor is attached to the other end of the arm 125. The voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 5 denotes a lid.

As a means related to the first invention, the base material contains at least one material selected from the group consisting of boron, silicon, tantalum, chromium, aluminum, zirconium, and nitrides and carbides thereof.

The base material particularly contains at least one material selected from the group consisting of BN, TaN, $Ta_2N$, ZrN, CrN, $Cr_2N$, $Si_3N_4$, TaC, ZrC, $B_4C$, AlN, and C.

Also, the orientation control layer is a nonmagnetic layer or a weak magnetic layer having a saturation magnetization of 400 emu/cc or less and a coercive force of 8 kA/m or less.

The grains forming this orientation control layer contain at least one material selected from the group consisting of iron, cobalt, rhenium, platinum, nickel, tantalum, chromium, molybdenum, tungsten, boron, and ruthenium.

As a desirable combination, the grains forming the orientation control layer contain at least one material selected from the group consisting of Pt, Ru, Co—Fe, Re, Ti, Ru—Cr, Ni—Ta, Co—Pt, Co—B, Co—Ru, Co—Cr, Co—Cr—Mo, Co—Cr—W, and Co—Cr—Pt.

In particular, the grains are made of a Co—Fe alloy and contain 80 at % or more of Co.

The grains have an average grain size of 10 nm or less.

Of the layers adjacent to the orientation control layer, the layer positioned on a side away from the substrate contains the main component element of the grains.

Of the layers adjacent to the orientation control layer, the layer positioned on the substrate side has a hexagonal closest packed structure or face-centered cubic structure as a closest packed crystal structure.

EMBODIMENTS

The present invention will be described in detail below by way of its embodiments.

Embodiment 1

In Embodiment 1 of the present invention, all films were formed in a vacuum chamber so evacuated that the vacuum degree was higher than $3\times10^{-5}$ Pa. A Co-6 at % Zr-10 at % Nb target and a nonmagnetic glass substrate 1 were opposed in the vacuum chamber. In this vacuum chamber, Ar gas was supplied to maintain a pressure of 0.6 Pa, and discharge was performed on the Co-6 at % Zr-10 at % Nb target at DC 500 W, thereby forming a 200-nm thick CoZrNb soft magnetic layer on the nonmagnetic glass substrate by sputtering.

In addition, this substrate on which the film was formed was opposed to a Co-10 at % Fe target. Ar gas was supplied to maintain a pressure of 0.5 Pa, and discharge was performed at DC 1,000 W to form a 5-nm thick Ru seed layer on the CoZrNb soft magnetic layer by sputtering.

The resultant substrate was opposed to a CoFe—BN target obtained by evenly mixing Co-10 at % Fe grains and BN grains at a volume ratio of CoFe: BN=1:3, and sintering the mixture. Ar gas was supplied to maintain a pressure of 1.0 Pa, and discharge was performed at RF 1,000 W to form a 3-nm thick CoFe—BN orientation control layer on the Ru seed layer by sputtering.

Subsequently, this substrate was opposed to a Co-18 at % Cr-15 at % Pt target. Ar gas was supplied to maintain a pressure of 2.0 Pa, and a 12-nm thick CoCrPt perpendicular recording layer was formed on the CoFe—BN orientation control layer by sputtering at DC 250 W.

Finally, the substrate was opposed to a C target. Ar gas was supplied to maintain a pressure of 0.5 Pa, and discharge was performed at DC 1,000 W to form a 7-nm thick C protective layer on the CoCrPt perpendicular recording layer by sputtering.

After all the film formation steps were complete, the C protective layer was coated with a 13-Å thick PFPE (Perfluoro Polyether) lubricating agent by dipping, thereby obtaining a medium A.

FIG. 6 is a schematic sectional view showing the arrangement of the obtained medium A of the present invention.

As shown in FIG. 6, the medium A has an arrangement in which a CoZrNb soft magnetic layer 12, Ru seed layer 13, CoFe—BN orientation control layer 14, CoCrPt perpendicular recording layer 15, C protective layer 16, and lubricating layer (not shown) are stacked in this order on a substrate 11.

Also, a CoFe—BN film was formed on a nonmagnetic glass substrate by using a CoFe—BN target under the same conditions as for the CoFe—BN orientation control layer described above. In addition, CoFe—BN film samples were formed in the same manner as above except that the film thickness was variously changed.

The planar structure of a 3-nm thick CoFe—BN film sample was observed by a TEM (Transmission Electron Microscope) at a magnification of ×1,000,000.

FIG. 8 is a model view showing the planar structure of the CoFe—BN film sample.

In FIG. 8, reference numeral 17 denotes CoFe grains; and 18, a BN base material.

As shown in FIG. 8, the planar structure was a granular structure in which the CoFe grains about 8 nm in diameter were dispersed at intervals of about 2 nm and the BN base material was present in the grain boundary so as to surround CoFe.

When the film thickness of the CoFe—BN film sample was larger than the average grain size of the CoFe grains, the number of CoFe grains exposed to the surface was small. This is presumably because the base material covered the CoFe grains. Also, the grain size was nonuniform.

The CoFe—BN film sample was then cut into a square piece of 1 cm side, and the magnetostatic characteristics of the sample were measured by applying a maximum external magnetic field of 8 kA/m by using a VSM (Vibrating Sample Magnetometer). Consequently, saturation magnetization Ms was about 85 emu/cc, and a coercive force Hc was about 780 A/m, indicating that the sample was weakly magnetic.

Furthermore, a sample was formed by forming a CoZrNb soft magnetic film and Ru seed layer on a substrate following the same procedures as for the medium A except that none of a CoFe—BN orientation control layer, CoCrPt perpendicular magnetic recording layer, C protective layer, and lubricating layer was formed. The crystallinity of the obtained Ru seed layer sample was checked by an X-ray diffraction method. As a consequence, a peak indicating the orientation of (002) faces of Ru having a hexagonal closest packed structure appeared. When the planar structure of this Ru seed layer was observed with the TEM, the average grain size of the grains of the Ru seed layer 3 was 12 nm.

In addition, a sample was formed by forming a CoZrNb soft magnetic film, Ru seed layer, CoFe—BN orientation control layer, and CoCrPt perpendicular magnetic recording layer on a substrate following the same procedures as for the medium A except that neither a C protective layer nor a lubricating layer was formed. The crystallinity of the obtained CoCrPt perpendicular magnetic recording layer sample was checked by the X-ray diffraction method. As a consequence, the sample had a hexagonal closest packed crystal structure, and (002) faces were strongly oriented. When the planar structure of this CoCrPt perpendicular magnetic recording layer was observed with the TEM, the average grain size of the grains was 6 nm.

This demonstrates that the fine structure of the CoFe—BN orientation control layer also gave the CoCrPt perpendicular magnetic recording layer a fine structure.

The magnetostatic characteristics of the recording layer of the obtained medium A were measured by applying a maximum magnetic field of 1,500 kA/m by using a Kerr effect magnetic measurement apparatus. Table 1 (to be presented later) shows a coercive force Hc, squareness ratio Rs, and nucleation field Hn obtained.

Also, a R/W test was conducted on the medium A by writing a signal by using a single pole head and reading out a signal by using an MR head. Table 1 (to be presented later) shows the values of SNRm, overwrite characteristic, and dPW50 obtained.

The measurements were performed at a fixed position, i.e., a radial position of 20 mm by rotating the disk at 4,200 rpm.

which had a face-centered cubic structure and in which (111) faces were oriented was formed, instead of the Ru seed layer 13, by using a Co-10 at % Fe target.

In the present invention as described above, it was possible to obtain a medium having a large squareness ratio in the magnetostatic characteristics, and a medium having high resolution and a high S/N ratio as the R/W characteristics.

COMPARATIVE EXAMPLE 1

For comparison, a medium B was obtained following the same procedures as in Embodiment 1 except that no CoFe—BN orientation control layer was formed.

FIG. 7 is a schematic sectional view showing the arrangement of the obtained conventional medium B.

As shown in FIG. 7, the medium B had the same arrangement as shown in FIG. 6 except that the CoFe—BN orientation layer 14 was not formed.

In addition, a sample was formed by forming a CoZrNb soft magnetic layer, Ru seed layer, and CoCrPt perpendicular magnetic recording layer on a substrate following the same procedures as for the medium B except that neither a C protective layer nor a lubricating layer was formed. The crystallinity of the obtained CoCrPt perpendicular magnetic recording layer sample was checked by the X-ray diffraction method. Consequently, the sample had a hexagonal closest packed crystal structure, and (002) faces were oriented. However, when the planar structure was observed with the TEM, the grin size was about 10 nm, i.e., was not well decreased compared to the medium A.

The magnetostatic characteristics of the recording layer were measured in the same manner as in Embodiment 1. The results are shown in Table 1 below.

TABLE 1

| | Medium | Hc (kA/m) | RS | Hn (kA/m) | SNRm (dB) | OW (dB) | dPW50 (nm) |
|---|---|---|---|---|---|---|---|
| Embodiment 1 | A | 318 | 0.91 | −45 | 20.1 | 41.2 | 62 |
| Comparative Example 1 | B | 307 | 0.88 | −40 | 18.6 | 41.0 | 78 |

S of SNRm as a medium S/N ratio is a value obtained by halving the difference between peak values, i.e., maximum + and − values obtained by one magnetization reversal of a 10-kFCI solitary waveform. Nm of SNRm is the value of rms (root mean square-inches) at 400 kFCI. The overwrite characteristic indicates the ratio of a signal output before overwriting to a remaining signal output after overwriting when a 552-kFCI signal was written after a 46-kFCI recording signal was written. The half-width dPW50 of a magnetization reversal portion, which indicates the resolution characteristic is a width (nm) by which an output difference (mV) obtained by differentiation before and after reversal in the magnetization reversal portion was 50%.

The same effects were obtained when Ru, Re, RuCr alloy, NiTa alloy, CoPt alloy, CoB alloy, CoRu alloy, CoCr alloy, CoCrMo alloy, and the like were used as the grains of the orientation control layer, and TaN, ZrN, TaC, ZrC, $B_4C$, CrN, $Si_3N_4$, AlN, C, and the like were used as the base material.

Also, the same effects as in Embodiment 1 of the present invention were obtained when a 5-nm thick CoFe seed layer The coercive forces Hc of the media A and B were almost equal. However, the squareness ratio RS and nucleation field Hn of the medium A according to the present invention were slightly larger than those of the medium B. This is presumably because the medium A was oriented better than the medium B, although the size of the crystal grains in the magnetic recording layer of the medium B was also decreased.

In addition, the medium A of the present invention was equivalent in OW value but superior in SNRm and dPW50 values to the conventional medium B.

Embodiment 2

After a CoZrNb soft magnetic layer was formed on a nonmagnetic glass substrate following the same procedures as in Embodiment 1, the substrate was opposed to a pair of a Pt target and $Si_3N_4$ target arranged on the same plane. Ar gas was supplied to maintain a pressure of 1.2 Pa, and, while discharge was performed on the Pt target and $Si_3N_4$ target at DC 500 W and RF 1,400 W, respectively, the plane on which these targets were arranged was rotated, thereby forming a 5-nm thick Pt—Si$_3$N$_4$ orientation control layer on the CoZrNb soft magnetic layer by sputtering.

After that, this substrate was opposed to a Co-35 at % Cr-20 at % Pt target. Ar gas was supplied to maintain a pressure of 0.5 Pa, and discharge was performed at DC 1,000 W to form a 10-nm thick CoCrPt underlayer on the Pt—Si$_3$N$_4$ orientation control layer by sputtering.

Subsequently, this substrate was opposed to a Co-14 at % Cr-14 at % Pt-2 at % B target. Ar gas was supplied to maintain a pressure of 0.6 Pa in the chamber, and a 12-nm thick CoCrPtB perpendicular recording layer was formed on the CoCrPt underlayer by sputtering at DC 250 W.

Finally, the substrate was opposed to a C target, Ar gas was supplied to maintain a pressure of 0.5 Pa, and discharge was performed at DC 1,000 W to form a 7-nm thick C protective layer on the CoCrPtB perpendicular recording layer by sputtering.

After all the film formation steps were complete, the C protective layer was coated with a 13-Å thick PFPE lubricating agent by dipping, thereby obtaining a medium C of the present invention.

Figure 9:
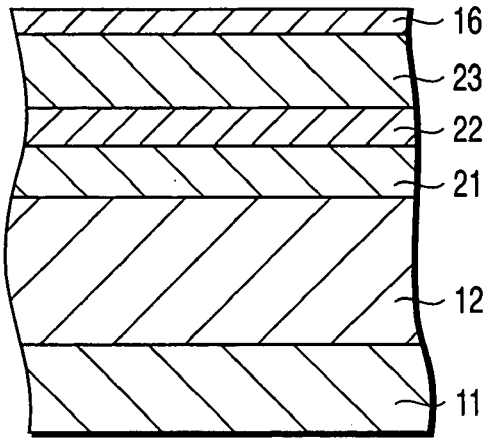
FIG. 9 is a schematic sectional view showing the sixth example of the magnetic recording medium of the present invention.

FIG. 9 is a schematic sectional view showing the arrangement of the obtained medium C of the present invention.

As shown in FIG. 9, the medium C has an arrangement in which a CoZrNb soft magnetic layer 12, Pt—Si$_3$N$_4$ orientation control layer 21, CoCrPt underlayer 22, CoCrPtB perpendicular recording layer 23, C protective layer 16, and lubricating layer (not shown) are stacked in this order on a substrate 11.

In addition, a Pt—Si$_3$N$_4$ film sample was formed on a nonmagnetic glass substrate by using a Pt target and Si$_3$N$_4$ target under the same conditions as for the Pt—Si$_3$N$_4$ orientation control layer described above. The characteristics of the obtained sample were checked.

The planar structure of this Si$_3$N$_4$ film sample was observed by a planar TEM at a magnification of ×1,000,000. Consequently, the planar structure was a so-called granular structure in which the Pt grains about 7 nm in diameter were dispersed at intervals of about 2 nm and surrounded by the Si$_3$N$_4$ base material.

The Pt—Si$_3$N$_4$ film sample was then cut into a square piece of 1 cm side, and the magnetostatic characteristics of the sample were measured by the VSM. As a consequence, the sample was nonmagnetic because it showed no magnetization even when an external magnetic field of up to 1,500 kA/m was applied.

Also, when the composition of the Pt—Si$_3$N$_4$ film sample was measured by an ICP-MS (Inductively Coupled Plasma Mass Spectrometer) method, the atomic ratio was substantially Pt:Si:N=9:3:4.

Furthermore, a CoCrPtB perpendicular recording layer sample was obtained by forming a CoZrNb soft magnetic film, Pt—Si$_3$N$_4$ orientation control layer, CoCrPt underlayer, and CoCrPtB perpendicular magnetic recording layer on a substrate following the same procedures as for the medium C except that neither a C protective layer nor a lubricating layer was formed. When the crystallinity was checked by the X-ray diffraction method, the sample was a film in which (002) faces of a hexagonal closest packed structure were oriented. When the planar structure of this CoCrPtB perpendicular magnetic recording layer was observed with the TEM, the average grain size was as small as 6 nm.

The magnetostatic characteristics and R/W characteristics of the medium C were measured following the same procedures as in Embodiment 1. The results are shown in Table 2 (to be presented later).

COMPARATIVE EXAMPLE 2

For comparison, a medium D was obtained following the same procedures as in Embodiment 2 except that instead of the Pt—Si$_3$N$_4$ orientation control layer 21, a 5-nm thick film was formed by sputtering by supplying Ar gas to maintain a pressure of 1.2 Pa, and performing discharge on an Si$_3$N$_4$ target at RF 1,400 W.

Figure 10:
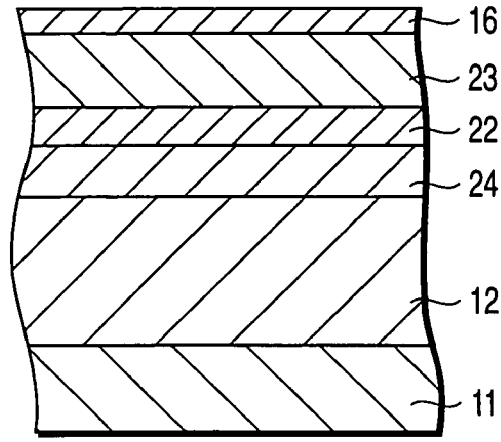
FIG. 10 is a schematic sectional view showing the second example of the conventional magnetic recording medium.

FIG. 10 is a schematic sectional view showing the arrangement of the obtained medium D.

As shown in FIG. 10, the medium D has an arrangement in which a CoZrNb soft magnetic layer 12, Si$_3$N$_4$ layer 24, CoCrPt underlayer 22, CoCrPtB perpendicular recording layer 23, C protective layer 16, and lubricating layer (not shown) are stacked in this order on a substrate 11.

In addition, a CoPrPtB perpendicular recording layer sample was formed following the same procedures as for the medium C except that neither a C protective layer nor a lubricating layer was formed. When the crystallinity was similarly checked by the X-ray diffraction method, the sample had a hexagonal closest packed crystal structure, and (002) faces were oriented. However, when the planar structure was observed with the TEM, the grin size was about 10 nm, i.e., was not well decreased compared to the medium C.

Also, an Si$_3$N$_4$ film sample was formed on a nonmagnetic glass substrate by using an Si$_3$N$_4$ target under the same conditions as for the Si$_3$N$_4$ layer described above. This sample was cut into a square piece of 1 cm side, and the magnetostatic characteristics of the sample were measured by the VSM. As a consequence, the sample was nonmagnetic because it exhibited no magnetization even when an external magnetic field of up to 1,500 kA/m was applied.

The magnetostatic characteristics and R/W characteristics of the medium D were measured in the same manner as in Embodiment 1. The results are shown in Table 2 below.

TABLE 2

| | Medium | Hc (kA/m) | RS | Hn (kA/m) | SNRm (dB) | OW (dB) | dPW50 (nm) |
|---|---|---|---|---|---|---|---|
| Embodiment 2 | C | 337 | 0.95 | −75 | 20.8 | 41.2 | 61 |
| Comparative Example 2 | D | 298 | 0.88 | −37 | 18.6 | 41.0 | 81 |

The medium C according to the present invention was superior in SNRm and dPW50 of the magnetostatic characteristics and R/W characteristics to the conventional medium D.

Note that the same effects were obtained even when Re, Ti, CoCrW alloy, CoCrPt alloy, and the like were used as the grains of the orientation control layer, and BN, Ta$_2$N, ZrN, TaC, and Cr$_2$N were used as the base material.

Embodiment 3

An Fe-11 at % Al-17 at % Si target and a nonmagnetic substrate 1 were opposed in a vacuum chamber having a vacuum degree of 1×10-5 Pa. In this vacuum chamber, Ar gas was supplied to maintain a pressure of 0.6 Pa, and discharge was performed on the target at DC 500 W to form a 130-nm thick FeAlSi soft magnetic layer on the nonmagnetic substrate by sputtering.

This substrate on which the film was formed was opposed to a Co-36 at % Cr-18 at % Pt-3 at % B target. Ar gas was supplied to maintain a pressure of 0.6 Pa, and discharge was performed at DC 300 W to form a 10-nm thick CoCrPtB seed layer on the FeAlSi soft magnetic layer by sputtering.

The resultant substrate was opposed to a CoFe—TaN target obtained by mixing Co-8 at % Fe alloy grains and TaN grains at a volume ratio of CoFe:TaN=2:3, and sintering the mixture. Ar gas was supplied to maintain a pressure of 2.0 Pa, and discharge was performed on the CoFe—TaN target at RF 500 W to form a 5-nm thick CoFe—TaN orientation control layer on the CoCrPtB seed layer by sputtering.

After that, the substrate was opposed to a Co-26 at % Cr-12 at % Pt-4 at % B target. Ar gas was supplied to maintain a pressure of 3.0 Pa, and discharge was performed at DC 500 W to form a 4-nm thick CoCrPtB underlayer on the CoFe—TaN orientation control layer by sputtering.

Subsequently, this substrate was opposed to a Co-18 at % Cr-15 at % Pt-1 at % B target. Ar gas was supplied to maintain a pressure of 3.0 Pa, and a 17-nm thick CoCrPtB perpendicular recording layer was formed on the CoCrPt underlayer by sputtering at DC 500 W.

Finally, a 7-nm thick DLC (Diamond Like Carbon) protective layer was formed on the CoCrPtB perpendicular recording layer by CVD.

After all the film formation steps were complete, the DLC protective layer was coated with a 13-Å thick PFPE lubricating agent by dipping, thereby obtaining a medium E.

Figure 11:
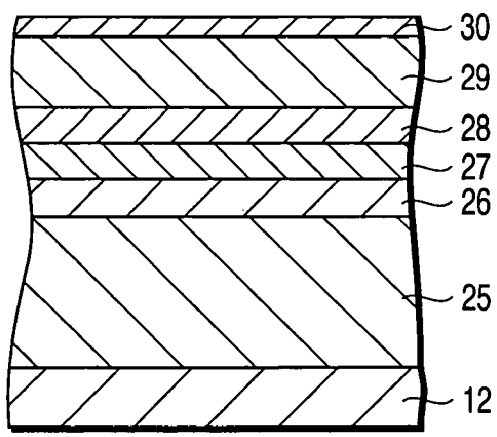
FIG. 11 is a schematic sectional view showing the seventh example of the magnetic recording medium of the present invention.

FIG. 11 is a schematic sectional view showing the arrangement of the obtained medium E of the present invention.

As shown in FIG. 11, the medium E has an arrangement in which an FeAlSi soft magnetic layer 25, CoCrPtB seed layer 26, CoFe—TaN orientation control layer 27, CoCrPtB underlayer 28, CoCrPtB perpendicular recording layer 29, and DLC protective layer 30 are stacked in this order on a substrate 12.

Also, a CoCrPtB underlayer was formed on a nonmagnetic glass substrate in the same manner as above by using the Co-36 at % Cr-18 at % Pt-3 at % B target of the medium E, thereby obtaining a CoCrPtB underlayer sample.

When the crystallinity of the sample was checked by the X-ray diffraction method, the sample was a film in which (002) faces of a hexagonal closest packed structure were oriented. Also, when the planar structure of this CoCrPtB underlayer sample was observed with the TEM, the average grain size was 12 nm.

In addition, the CoFe—TaN target described above was used to form a film on a nonmagnetic glass substrate under the same conditions as above, thereby forming a CoFe—TaN film sample. The characteristics of this sample were checked.

The planar structure of this CoFe—TaN film sample was observed with the TEM at a magnification of ×1,000,000. Consequently, the sample had a so-called granular structure in which CoFe grains about 6 nm in diameter were evenly dispersed at intervals of about 2 nm and surrounded by the TaN base material.

When the composition of the CoFe—TaN film sample was measured by the ICP-MS method, the atomic ratio was Co:Fe:Ta:N=9:1:4:4.

The CoFe—TaN film sample was then cut into a square piece of 1 cm side, and the magnetostatic characteristics were measured by applying a maximum external magnetic field of 20 kA/m by the VSM. As a consequence, the saturation magnetic field Ms was about 70 emu/cc, and the coercive force was 7 kA/m, indicating that the sample was weakly magnetic.

Also, a CoCrPtB perpendicular magnetic recording layer sample having the same structure as the medium E except that neither a DLC protective film nor a lubricating layer was formed was obtained.

When the crystallinity was checked by the X-ray diffraction method, the sample had a hexagonal closest packed crystal structure, and (002) faces were oriented.

The planar structure of the CoCrPtB perpendicular recording layer was observed with the TEM at a magnification of ×1,000,000. As a consequence, the grain size was about 6 nm.

The magnetostatic characteristics and R/W characteristics of the medium E were measured in the same manner as in Embodiment 1. The results are shown in Table 3 (to be presented later).

COMPARATIVE EXAMPLE 3

For comparison, a conventional medium F was obtained following the same procedures as in Embodiment 3 except that no CoFe—TaN orientation control layer was formed.

Figure 12:
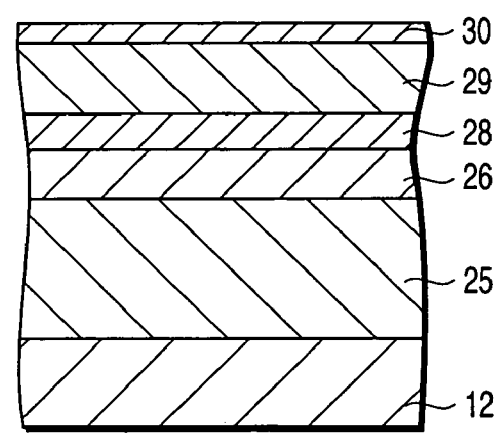
FIG. 12 is a schematic sectional view showing the third example of the conventional magnetic recording medium.

FIG. 12 is a schematic sectional view showing the arrangement of the medium F.

As shown in FIG. 12, the medium F has the same structure as the medium E shown in FIG. 11 except that the CoFe—TaN orientation control layer 27 was not formed.

When the crystallinity of the medium F was checked by the X-ray diffraction method, the medium F had a hexagonal closest packed crystal structure, and (002) faces were oriented.

The planar structure of the CoCrPtB perpendicular recording layer was observed with the TEM at a magnification of ×1,000,000. As a consequence, the grain size was about 10 nm. That is, the grain size of the CoCrPtB perpendicular recording layer sample of Embodiment 3 was smaller.

The magnetostatic characteristics and R/W characteristics of the medium F were measured in the same manner as in Embodiment 1. The results are shown in Table 3 below.

Table 3 shows that even when the orientation control film having a granular structure was formed between the seed layer and underlayer, the medium E of the present invention was superior in SNRm and dPW50 of the magnetostatic characteristics and R/W characteristics to the conventional medium F.

COMPARATIVE EXAMPLE 4

A medium G was obtained following the same procedures as in Embodiment 3 except that the thickness of a CoFe—TaN orientation control layer was changed to 10 nm. Also, following the same procedures as for the medium G, a CoFe—TaN film sample was formed by forming a CoFe—TaN orientation control layer on a nonmagnetic substrate.

When the planar structure of this CoFe—TaN film sample was observed with the TEM at a magnification of ×1,000, 000, the grain size was about 6 nm.

COMPARATIVE EXAMPLE 5

A medium H was obtained following the same procedures as in Embodiment 3 except that a CoFe—TaN target containing Co-8 at % Fe alloy grains and TaN grains at a volume ratio of CoFe:TaN=1:1 was used to form a 5-nm thick CoFe—TaN orientation control layer on a CoCrPtB seed layer by sputtering by performing discharge at DC 500 W while the Ar gas pressure was maintained at 0.5 Pa. Also, a CoFe—TaN film sample was formed on a nonmagnetic substrate in the same manner as for the CoFe—TaN orientation control layer of the medium H.

The planar structure of the CoFe—TaN film sample was observed with the TEM at a magnification of ×1,000,000. Consequently, the CoFe grains having a grain size of about 9 nm were dispersed in the TaN base material.

When the magnetostatic characteristics were measured, the saturation magnetization Ms was 560 emu/cc, and the coercive force Hc was 10 kA/m.

COMPARATIVE EXAMPLE 6

A medium I was obtained following the same procedures as in Embodiment 3 except that a CoFe—TaN target containing Co-8 at % Fe alloy grains and TaN grains at a volume ratio of CoFe:TaN=3:2 was used, and the thickness of a CoFe—TaN orientation control layer was changed to 10 nm. Also, a CoFe—TaN film sample was formed on a nonmagnetic substrate in the same manner as for the CoFe—TaN orientation control layer of the medium I.

The planar structure of the CoFe—TaN film sample was observed with the TEM at a magnification of ×1,000,000. Consequently, the CoFe grains having a grain size of about 12 nm were dispersed in the TaN base material.

COMPARATIVE EXAMPLE 7

A comparative medium J was obtained following the same procedures as in Embodiment 3 except that a Cr seed layer was formed instead of the CoCrPtB seed layer. Also, a Cr seed layer sample was obtained by forming an FeAlSi soft magnetic layer and Cr seed layer on a substrate following the same procedures as in Embodiment 3. In addition, a CoFe—TaN film sample was obtained by further forming a CoFe—TaN orientation control layer on the Cr seed layer sample.

When the crystallinity of the Cr seed layer sample was checked by the X-ray diffraction method, (200) faces of Cr having a body-centered cubic structure were oriented. When the planar structure of the CoFe—TaN film sample was observed with the TEM, the CoFe grains having a grain size of about 2 nm were dispersed in the TaN base material. This is presumably because the Cr seed layer having the body-centered cubic structure was used in the medium j, so the average grain size of the CoFe grains in the CoFe—TaN orientation control layer formed on the Cr seed layer was smaller than that of the CoFe—TaN orientation control layer of the medium E of Embodiment 3.

Table 3 shows the results of measurements of the magnetostatic characteristics and R/W characteristics of Comparative Examples 4 to 7.

TABLE 3

| | Medium | Hc (kA/m) | RS | Hn (kA/m) | SNRm (dB) | OW (dB) | dPW50 (nm) |
|---|---|---|---|---|---|---|---|
| Embodiment 3 | E | 357 | 0.96 | −78 | 21.8 | 40.8 | 61 |
| Comparative Example 3 | F | 310 | 0.90 | −40 | 19.6 | 40.5 | 77 |
| Comparative Example 4 | G | 298 | 0.87 | −36 | 18.7 | 41.0 | 80 |
| Comparative Example 5 | H | 340 | 0.92 | −70 | 19.0 | 40.5 | 80 |
| Comparative Example 6 | I | 351 | 0.93 | −73 | 19.0 | 40.4 | 83 |
| Comparative Example 7 | J | 311 | 0.90 | −41 | 19.2 | 40.7 | 80 |

As in Comparative Example 4, when the thickness of the orientation control layer having a granular structure was larger than the size of grains forming this granular structure, degradation of the coercive force and squareness ratio was large, and SNRm and dPW50 degraded.

As in Comparative Example 5, when the magnetization and coercive force of the orientation control layer having a granular structure were large, the coercive force and squareness ratio increased, but SNRm and dPW50 degraded.

As in Comparative Example 6, when the grain size of the granular underlayer was larger than 10 n, the coercive force and squareness ratio increased, but SNRm and dPW50 more or less degraded. In particular, degradation of dPW50 was large.

As in Comparative Example 7, when a film having a body-centered cubic structure, rather than a closest packed crystal structure, was used in the seed layer adjacent to the substrate side of the orientation control layer having a granular structure, the grain size of the granular structure became too small. As a consequence, neither the magnetostatic characteristics nor the electromagnetic conversion characteristics improved.

Embodiment 4

In Embodiment 4, all films were formed in a vacuum chamber having a vacuum degree of $1\times10^{-5}$ Pa. A Co-6 at % Zr-10 at % Nb target and a nonmagnetic glass substrate 40 were opposed in the vacuum chamber. In this vacuum chamber, Ar gas was supplied to maintain a pressure of 0.6 Pa, and discharge was performed on the Co-6 at % Zr-10 at % Nb target at DC 500 W, thereby forming a 200-nm thick CoZrNb soft magnetic layer on the nonmagnetic glass substrate by sputtering.

In addition, this substrate on which the film was formed was opposed to an Ru target. Ar gas was supplied to maintain a pressure of 0.5 Pa, and discharge was performed at DC 1,000 W to form a 5-nm thick Ru seed layer on the CoZrNb soft magnetic layer by sputtering.

The resultant substrate was opposed to a CoFe—BN target obtained by evenly mixing Co-10 at % Fe grains and BN grains at a volume ratio of CoFe:BN=1:3, and sintering the mixture. Ar gas was supplied to maintain a pressure of 1.0 Pa, and discharge was performed at RF 1,000 W to form a 3-nm thick CoFe—BN underlayer on the Ru seed layer by sputtering.

The substrate was then opposed to a target obtained by mixing a CoCrPt powder made of a Co-18 at % Cr-15 at % Pt alloy and an $SiO_2$ powder at a volume ratio of CoCrPt:$SiO_2$=1:2, and sintering the mixture. Ar gas was supplied to maintain a pressure of 2.0 Pa, and a 12-nm thick CoCrPt—$SiO_2$ perpendicular recording layer was formed on the CoFe—BN underlayer by sputtering at RF 500 W.

Finally, this substrate was opposed to a C target. Ar gas was supplied to maintain a pressure of 0.5 Pa, and discharge was performed at DC 1,000 W to form a 7-nm thick C protective layer on the CoCrPt—$SiO_2$ perpendicular recording layer by sputtering.

After all the film formation steps were complete, the C protective layer was coated with a 13-Å thick PFPE lubricating agent by dipping, thereby obtaining a medium K.

That is, the medium K of Embodiment 4 of the present invention had the same structure as the medium A of Embodiment 1 of the present invention except that the recording layer was CoCrPt—$SiO_2$. This CoCrPt—$SiO_2$ perpendicular recording layer of the medium K of the present invention was observed with the TEM. Consequently, the layer was a granular magnetic film in which the $SiO_2$ base material surrounded the CoCrPt grains having an average grain size of 5 nm such that these grains were separated by 2 nm on average.

COMPARATIVE EXAMPLE 8

As a comparative example, a comparative medium L was formed following the same procedures as for the medium K of Embodiment 4 of the present invention except that no CoFe—BN underlayer was formed.

Table 4 below shows the results of measurements of the magnetostatic characteristics and R/W characteristics of Embodiment 4 and Comparative Example 8.

TABLE 4

|  | Medium | Hc (kA/m) | RS | Hn (kA/m) | SNRm (dB) | OW (dB) | dPW50 (nm) |
|---|---|---|---|---|---|---|---|
| Embodiment 4 | K | 310 | 0.91 | −53 | 18.9 | 41.0 | 65 |
| Comparative Example 8 | L | 290 | 0.85 | −38 | 17.8 | 40.9 | 70 |

As in Embodiment 4, even when the granular layer was also used as a magnetic recording layer, the use of the nonmagnetic granular layer as an underlayer increased the coercive force and squareness ratio, and increased both the SNRm value and resolution. However, the values of these characteristics were slightly worse than those of Embodiment 1 in which no granular film was used as the recording layer.

In the present invention as has been explained above, magnetic recording can be performed at a high recording density by increasing the medium noise ratio and recording resolution by decreasing the grain size of crystal grains of a magnetic recording layer and improving the orientation of these grains.

Note that in the embodiments and comparative examples described above, layers were stacked on one surface of a substrate. However, layers can also be stacked on the two surfaces of a substrate by performing sputtering with the substrate placed between a pair of targets.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A magnetic recording medium comprising a nonmagnetic substrate, an orientation control layer formed on the nonmagnetic substrate, having a granular structure containing a base material and grains dispersed in the base material, and having a thickness smaller than a grain size of the grains, and a magnetic recording layer formed on the orientation control layer,
wherein the base material contains at least one material selected from the group consisting of boron, silicon, tantalum, chromium, aluminum, zirconium, and nitrides and carbides thereof.

2. A medium according to claim 1, wherein the base material contains at least one material selected from the group consisting of BN, TaN, Ta2N, ZrN, CrN, Cr2N, Si3N4, TaC, ZrC, B4C, AlN, and C.

3. A medium according to claim 1, wherein the orientation control layer is a nonmagnetic layer.

4. A medium according to claim 1, wherein the orientation control layer is a weak magnetic layer having a saturation magnetization of not more than 400 emu/cc and a coercive force of not more than 8 kA/m.

5. A medium according to claim 1, wherein the grains forming the orientation control layer contain at least one material selected from the group consisting of iron, cobalt, rhenium, platinum, nickel, tantalum, chromium, molybdenum, tungsten, boron, and ruthenium.

6. A medium according to claim 5, wherein the grains contain at least one material selected from the group consisting of Pt, Ru, Co Fe, Re, Ti, Ru Cr, Ni Ta, Co Pt, Co B, Co Ru, Co Cr, Co Cr Mo, Co Cr W, and Co Cr Pt.

7. A medium according to claim 6, wherein the grains are made of a Co Fe alloy.

8. A medium according to claim 7, wherein the grains are made of a Co Fe based alloy containing not less than 80 at % of Co.

9. A medium according to claim 1, wherein the grains have an average grain size of not more than 10 nm.

10. A medium according to claim 1, further comprising an underlayer which contains a main component element of the grains, is adjacent to the orientation control layer, and is positioned on a side away from the substrate.

11. A medium according to claim 1, further comprising a seed layer which has one of a hexagonal closest packed structure and face centered cubic structure as a closest packed crystal structure, is adjacent to the orientation control layer, and is positioned on a substrate side.

12. A medium according to claim 11, wherein the grains of the orientation control layer have an average grain size smaller than an average grain size of crystal grains in the seed layer.

13. A magnetic recording/reproducing apparatus comprising a recording/reproducing head, and
a magnetic recording medium comprising a nonmagnetic substrate, an orientation control layer formed on the nonmagnetic substrate, having a granular structure containing a base material and grains dispersed in the base material, and having a thickness smaller than a grain size of the grains, and a magnetic recording layer formed on the orientation control layer,
wherein the base material contains at least one material selected from the group consistin of boron, silicon, tantalum, chromium, aluminum, zirconium, and nitrides and carbides thereof.

14. An apparatus according to claim 13, wherein the base material contains at least one material selected from the group consisting of BN, TaN, Ta2N, ZrN, CrN, Cr2N, Si3N4, TaC, ZrC, B4C, AlN, and C.

15. An apparatus according to claim 13, wherein the orientation control layer is a nonmagnetic layer.

16. An apparatus according to claim 13, wherein the orientation control layer is a weak magnetic layer having a saturation magnetization of not more than 400 emu/cc and a coercive force of not more than 8 kA/m.

17. An apparatus according to claim 13, wherein the grains forming the orientation control layer contain at least one material selected from the group consisting of iron, cobalt, rhenium, platinum, nickel, tantalum, chromium, molybdenum, tungsten, boron, and ruthenium.

18. An apparatus according to claim 17, wherein the grains contain at least one material selected from the group consisting of Pt, Ru, Co Fe, Re, Ti, Ru Cr, Ni Ta, Co Pt, Co B, Co Ru, Co Cr, Co Cr Mo, Co Cr W, and Co Cr Pt.

19. An apparatus according to claim 18, wherein the grains are made of a Co Fe alloy.

20. An apparatus according to claim 19, wherein the grains are made of a 6Co Fe based alloy containing not less than 80 at % of Co.

21. An apparatus according to claim 13, wherein the grains have an average grain size of not more than 10 nm.

22. An apparatus according to claim 13, wherein the magnetic recording medium further comprises an underlayer which contains a main component element of the grains, is adjacent to the orientation control layer, and is positioned on a side away from the substrate.

23. An apparatus according to claim 13, wherein the magnetic recording medium further comprises a seed layer which has one of a hexagonal closest packed structure and face centered cubic structure as a closest packed crystal structure, is adjacent to the orientation control layer, and is positioned on a substrate side.

24. An apparatus according to claim 23, wherein the grains of the orientation control layer have an average grain size smaller than an average grain size of crystal grains in the seed layer.

25. A medium according to claim 1, wherein the magnetic recording layer contains a main component element of the grains, and is adjacent to the orientation control layer.

26. An apparatus according to claim 13, wherein the magnetic recording layer contains a main component element of the grains, and is adjacent to the orientation control layer.

* * * * *